(12) United States Patent
Mennenga et al.

(10) Patent No.: US 7,184,507 B2
(45) Date of Patent: Feb. 27, 2007

(54) RESIDUAL PHASE ERROR CORRECTION

(75) Inventors: Menno Mennenga, Dresden (DE); Frank Poegel, Dresden (DE); Michael Schmidt, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 835 days.

(21) Appl. No.: 10/284,646

(22) Filed: Oct. 31, 2002

(65) Prior Publication Data

US 2003/0223524 A1 Dec. 4, 2003

(30) Foreign Application Priority Data

May 31, 2002 (DE) ................ 102 24 161

(51) Int. Cl.
*H04L 7/00* (2006.01)
(52) U.S. Cl. ............... 375/371; 375/354; 375/373
(58) Field of Classification Search ........... 375/371, 375/354, 373, 375, 327, 286, 294; 370/375.03, 370/516, 517, 252
See application file for complete search history.

(56) References Cited

U.S. PATENT DOCUMENTS 4,604,583 A  8/1986 Aoyagi et al.
5,621,537 A * 4/1997 Shibue et al. ............ 386/17
6,661,834 B1 12/2003 Shan et al.
6,891,440 B2 * 5/2005 Straub et al. ............. 331/1 R

FOREIGN PATENT DOCUMENTS

DE 4208808 9/1993
DE 4446637 12/1994

OTHER PUBLICATIONS

English translation of Office Action in application No. DE 10224161.9-31 mailed Sep. 28, 2004.
English translation of Official Communication Issued Apr. 21, 2004 in German application No. 10224161.9-31.

* cited by examiner

*Primary Examiner*—Dac Ha
*Assistant Examiner*—Jaison Joseph
(74) *Attorney, Agent, or Firm*—Meyertons Hood Kivlin Kowert & Goetzel, P.C.; B. Noël Kivlin

(57) ABSTRACT

A phase error correction technique in data communication receivers such as WLAN (Wireless Local Area Network) receivers is provided. A signal having a phase error is received, and a phase error correction mechanism having a loop structure is operated on the input signal to correct the phase error. The corrected signal still has a residual phase error. The residual phase error is then compensated taking into account a loop time delay of the loop structure. Further, a phase change rate may be taken into account, and a smoothing process may additionally be performed.

47 Claims, 4 Drawing Sheets

RESIDUAL PHASE ERROR CORRECTION

BACKGROUND OF THE INVENTION

1. Field of the Invention

The invention generally relates to data communication systems such as WLAN (Wireless Local Area Network) systems, and in particular to the correction of phase errors in signals received by data communications receivers in such systems.

2. Description of the Related Art

A Wireless Local Area Network is a flexible data communications system implemented as an extension to or as an alternative for, a wired LAN. Using radio frequency or infrared technology, WLAN devices transmit and receive data over the air, minimizing the need of wired connections. Thus, WLAN systems combine interconnectivity with user mobility.

Most WLAN systems use spread spectrum technology, a wide-band radio frequency technique developed for use in reliable and secure communications systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to the 802.11b standard that allows data rates of 5.5 and 11 Mbps in the 2.4 GHz spectrum. This extension is backwards compatible as far as it relates to direct sequence spread spectrum technology, but it adopts a new modulation technique called CCK (Complementary Code Keying) which allows the speed increase.

In WLAN systems as well as in other spread spectrum communication systems, the signal on its way from the transmitter to the receiver experiences several distortions which may lead to a frequency error.

Assuming s(t) to be the transmitted signal $$s(t)=A(t) \cdot e^{j\omega t}$$

where ω is the carrier frequency, the received signal can be described as $$r(t)=B(t) \cdot e^{j[(\omega+\omega_e)t+\phi_e(t)]}$$

where $\omega_e$ is the carrier frequency difference between receiver and transmitter, and $\phi_e$ is the difference in phase between the receiver and the transmitter.

Turning now to FIG. 1, an error correction arrangement is schematically shown consisting of a frequency error correction unit 100 and a phase error correction unit 110. The frequency error correction unit 100 is used to compensate for the frequency difference, and the phase error correction unit 110 will then compensate for the residual phase error. This will now be described in more detail.

Assuming the baseband signal input to the frequency error correction unit 100 be given as $$B(t) \cdot e^{j(\omega_e t+\phi_0)}$$

the output signal of the frequency error correction unit 100 will be $$B(t) \cdot e^{j(\tilde{\omega}_e t+\phi_0)}$$

This signal can be considered a signal with time dependent phase $$\phi_e(t)=\tilde{\omega}_e t+\phi_0$$

which will linearly grow in time, as $\tilde{\omega}_e$ and $\phi_0$ are constant values.

The phase error correction unit 110 has now the task to remove the remaining phase error such that the received signal is as close as possible to the transmitted signal, to minimize the probability of demodulation errors. An example of how the phase error correction unit 110 may operate is depicted in FIG. 2.

The phase error correction unit 110 of FIG. 2 includes an error correction module 200 that performs the following operation:

$$B(t) \cdot e^{j\phi_e(t)} \cdot e^{-j\tilde{\phi}_e(t)} = B(t) \cdot e^{j[\Phi_e(t)]}$$

where $\tilde{\phi}_e(t)$ is the current estimate of the phase error. The error correction module 200 is controlled by means of an error signal received from the measurement module 210. The measurement module 210 measures the phase error of the output signal of the correction module 200 and tries to generate the error signal so as to minimize the phase difference $\phi_e(t)-\tilde{\phi}_e(t)$.

However in conventional systems, the phase difference cannot be completely extinguished since the loop structure of FIG. 2 has a built in loop time delay so that the error correction module 200 will at any time receive an error signal that comes too late. This will be more apparent from FIG. 3.

As mentioned above, the output signal of the frequency error correction unit 100, i.e. the input to the phase error correction unit 110, will have a time dependent phase which linearly grows in time. This will lead to the sawtooth curve shown in FIG. 3 (noting that the turn-over limit of π/4 shown in the figure relates to QpsK modulation while e.g. in BpsK, this limit would be π/2). As the processing delay in the error measurement module 210 leads to a loop time delay T between the output signal of the correction module 200 and the error signal, the error signal $\tilde{\phi}_e(t)$ will be delayed by this time. As apparent from FIG. 3, this leads to a residual phase error Δφ that may be substantially constant in time.

Thus, even if the error measurement module 210 will exactly measure the phase error, and even if the error correction module 200 will operate precisely, there will still be a residual phase error at the output of the conventional phase error correction unit due to the delay in the loop structure. Such loop time delay may also occur in phase error correction units of a different construction compared with that of FIG. 2, provided that there is a feedback structure in the arrangement. Moreover, the delay may have several delay components pertaining to any or all circuits found in the loop structure.

As there is still a residual phase error in the corrected signals, the demodulation reliability and throughput in subsequent signal processing units may be decreased.

SUMMARY OF THE INVENTION

An improved phase error correction technique is provided that may more precisely correct the phase error thereby improving reliability and throughput.

In one embodiment, a WLAN receiver is provided that has a phase error correction unit. The phase error correction unit comprises a first subunit connected to receive an input signal having a phase error. The first subunit includes a phase error correction mechanism to operate on the input signal and output a corrected signal. The corrected signal still has a residual phase error. The phase error correction unit further comprises a second subunit that is connected to receive the corrected signal and that is adapted to compensate the residual phase error and output a compensated signal. The phase error correction mechanism in the first subunit has a loop structure. The second subunit is adapted to take into account a loop time delay of the loop structure when compensating the residual phase error.

In another embodiment, a receiver in a data communications system is provided. The receiver has a phase error correction unit that comprises a first subunit connected to receive an input signal having a phase error. The first subunit includes a phase error correction mechanism to operate on the input signal and output a corrected signal. The corrected signal still has a residual phase error. The phase error correction unit further comprises a second subunit that is connected to receive the corrected signal and that is adapted to compensate the residual phase error and output a compensated signal. The phase error correction mechanism in the first subunit has a loop structure. The second subunit is adapted to take into account a loop time delay of the loop structure when compensating the residual phase error.

In a further embodiment, there may be provided an integrated circuit chip for performing a phase error correction in a data communications receiver. The integrated circuit chip comprises first circuitry connected to receive an input signal having a phase error. The first circuitry includes a phase error correction mechanism to operate on the input signal and output a corrected signal. The corrected signal still has a residual phase error. The integrated circuit chip further comprises second circuitry connected to receive the corrected signal and adapted to compensate the residual phase error and output a compensated signal. The phase error correction mechanism in the first circuitry has a loop structure. The second circuitry is adapted to take into account a loop time delay of the loop structure when compensating the residual phase error.

In a further embodiment, a method of correcting a phase error in a WLAN receiver is provided. The method comprises receiving an input signal having a phase error, performing a phase error correction process to generate a corrected signal that still has a residual phase error, and compensating the residual phase error. The phase error correction process has a loop structure. The compensation takes into account a loop time delay of the loop structure.

In still a further embodiment, there is provided a method of correcting a phase error in a data communications receiver. The method comprises receiving an input signal having a phase error, performing a phase error correction process to generate a corrected signal that still has a residual phase error, and compensating the residual phase error. The phase error correction process has a loop structure. The compensation takes into account a loop time delay of the loop structure.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
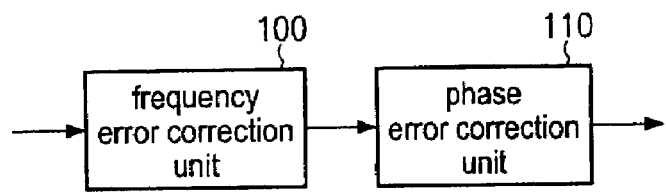
FIG. 1 is a schematic block diagram illustrating the components used for correcting frequency and phase errors in data communications receivers such as WLAN receivers.
Figure 2:
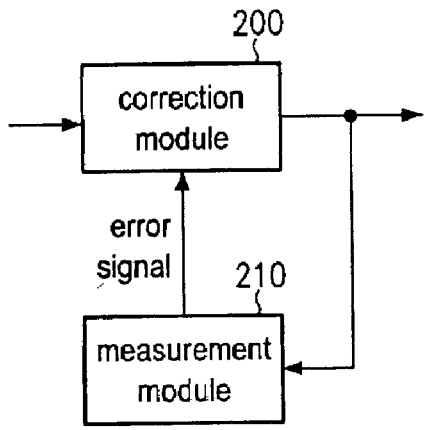
FIG. 2 schematically illustrates an example of a conventional phase error correction unit having a loop structure.
Figure 4:
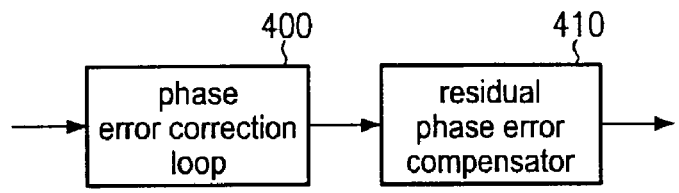
FIG. 4 illustrates a phase error correction unit according to an embodiment.

Referring now to the drawings and particularly to FIG. 4 which illustrates an embodiment of a phase error correction unit, there is provided a phase error correction loop 400 that may for instance be of a construction such as that of FIG. 2. It is however to be noted that the phase error correction loop 400 is not restricted to this example but may be any other arrangement having a loop structure in it.

As apparent from FIG. 4, the output of the phase error correction loop 400 is fed to a residual phase error compensator 410. The residual phase error compensator 410 receives a corrected output signal that still has a residual phase error, and compensates this error. The compensated signal is output for further processing.

Figure 3:
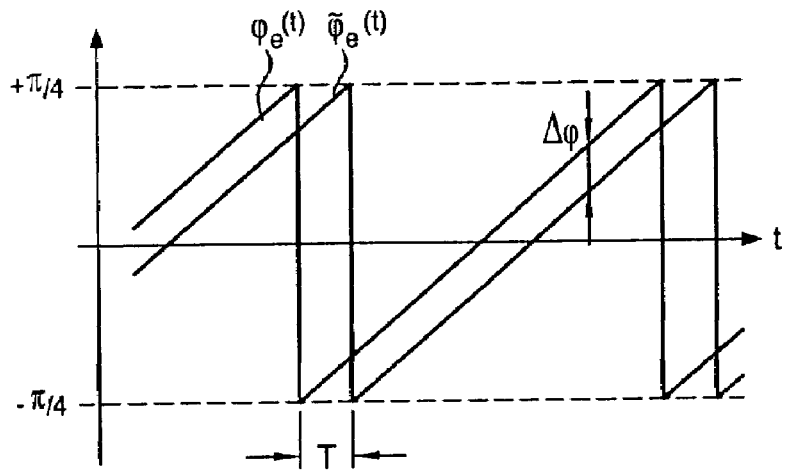
FIG. 3 is a time chart that may be used for explaining the generation of a residual phase error.

In the residual phase error compensator 410, the loop time delay of the phase error correction loop 400 will be taken into account. This can be best explained referring back to FIG. 3.

As discussed earlier, the phase error linearly grows in time having a phase change rate, or slope, of $$\frac{d\varphi_e}{dt} = \frac{\Delta\varphi}{T} = \tilde{\omega}_e,$$

i.e. the residual frequency error. The residual phase error can then be approximated by multiplying the slope with the loop time delay. Thus, the greater the loop time delay, the greater will be the residual phase error. This is the reason why the residual phase error compensator 410 will take into account the loop time delay.

It is to be noted that a dependency of the residual phase error on the loop time delay will exist even in cases where the phase error grows non-linearly in time.

Figure 5:
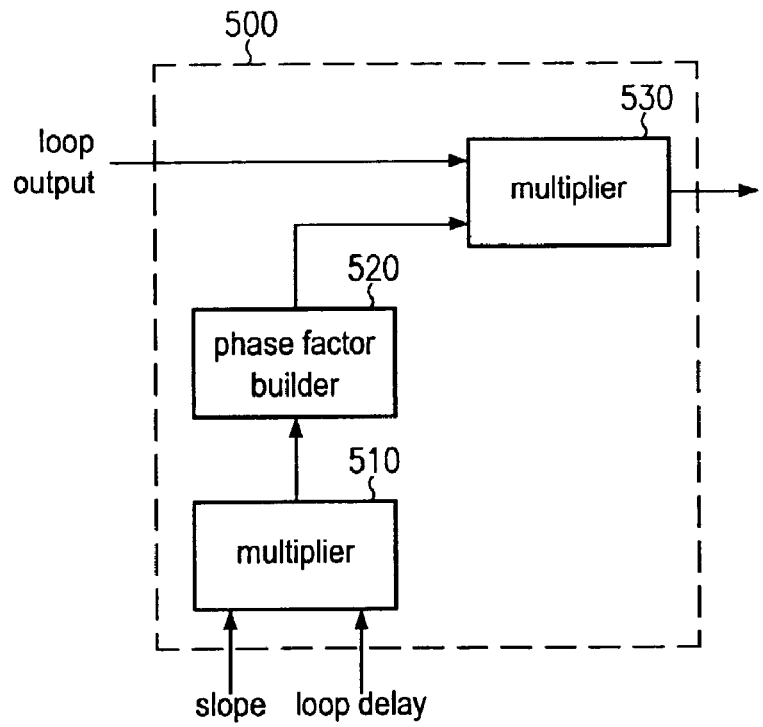
FIG. 5 illustrates a phase shift unit that may be used in the residual phase error compensator that is a component of the phase error correction unit of FIG. 4.

For taking into account the loop time delay in the residual phase error compensator 410, the compensator may comprise a phase shift unit 500 as shown in FIG. 5. This unit receives a signal that is indicative of the loop delay, and a signal indicative of the slope, i.e. the residual frequency error. The slope and the loop delay are then multiplied by multiplier 510, and the output of the multiplier 510 is fed to a phase factor builder 520 that produces a phase factor $e^{-j\Delta\Phi}$. This phase factor is then multiplied by complex multiplier 530 with the output signal of the phase error correction loop 400.

Since the exponent of the phase factor is the negative equivalent of the residual phase error, the output signal of multiplier 530 will have the residual phase error compensated.

With respect to the question where the slope and loop delay signals come from, there may be many possibilities. In the following, three embodiments will be discussed with reference to FIGS. 6, 7 and 8, and it is to be noted that other examples are possible as well.

Figure 6:
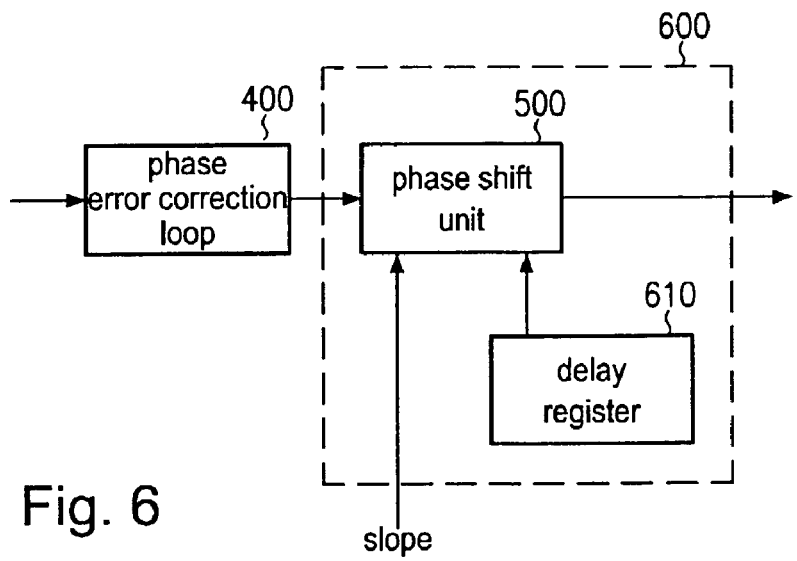
FIG. 6 illustrates a phase error correction unit according to another embodiment.

Turning first to FIG. 6, the residual phase error compensator 600 comprises the phase shift unit 500 shown in FIG. 5, or any other equivalent circuit. Further, the residual phase error compensator 600 comprises a delay register 610 that is connected to the phase shift unit 500 to provide the loop time delay information. The delay register 610 of the present embodiment stores a value that indicates the loop delay occurring in the phase error correction loop 400.

The delay register 610 may further store loop delay values pertaining to other loops from which the residual phase error compensator 600 may receive signals. Moreover, if the phase error correction loop 400 has different loop delays in certain conditions, the delay register 610 may store a value of each of the different loop delays pertaining to one and the same phase error correction loop 400. For example, if the overall arrangement shown in FIG. 6 can operate in different data transfer modes such as the 1, 2, 5.5 and 11 Mbps modes existing in WLAN systems, the loop delay in the phase error correction loop 400 may depend on the data rate, and the delay register 610 will then store different delay values for different data rates.

As shown in FIG. 6, the residual phase error compensator 600 receives slope information from the external. For this purpose, the residual phase error compensator 600 may comprise an input terminal for receiving the respective slope signal. This signal may come from a residual frequency error estimation circuit of the receiver, or from the phase error correction loop as shown in the embodiment of FIG. 7.

In this embodiment, the phase error correction loop 700 comprises, besides the error correction module 200 and the measurement module 210 discussed above, a slope measurement unit 710 that receives the input signal. This input signal has already undergone frequency error correction and exhibits a residual frequency error that drives the phase error to grow in time. The slope measurement unit 710 investigates the received input signal and determines the phase change rate in the signal, to generate the slope information to be fed to the phase shift unit 500 of the residual phase error compensator 600.

It is to be noted that in other embodiments, the slope measurement unit 710 may be connected to receive the error signal instead of the input signal. In still a further embodiment, the slope measurement unit 710 may be incorporated into the measurement module 210.

Figure 7:
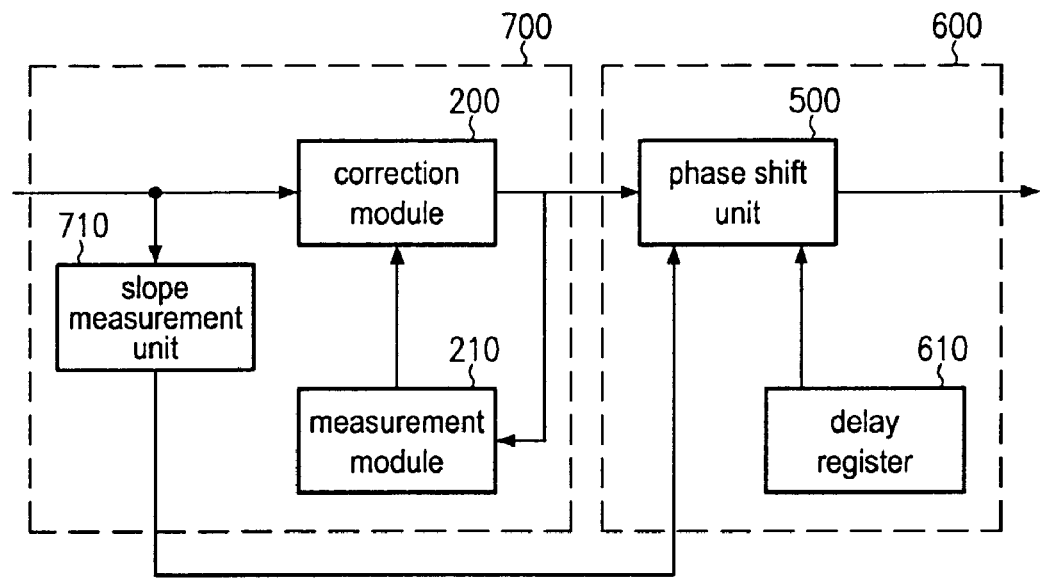
FIG. 7 illustrates a phase error correction unit according to still another embodiment.
Figure 8:
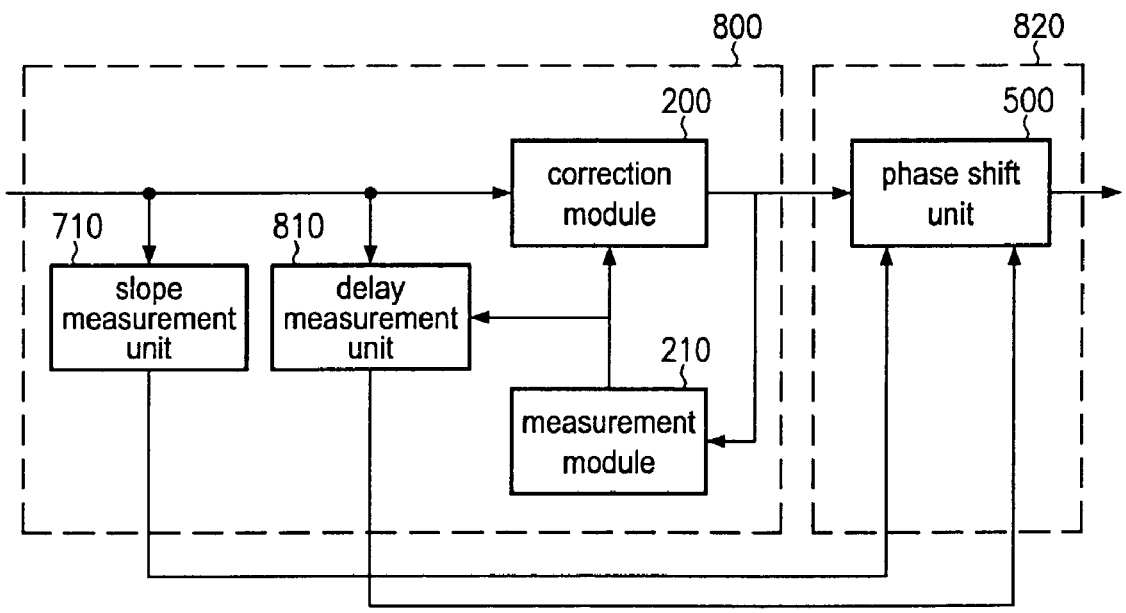
FIG. 8 illustrates a phase error correction unit according to a further embodiment.

Turning now to FIG. 8, an arrangement is shown that differs from that of FIG. 7 with respect to the generation of the loop delay information. In detail, in the embodiment of FIG. 8 there is no delay register provided in the residual phase error compensator 820. Rather, the residual phase error compensator 820 consists substantially of the phase shift unit 500, and comprises an additional input terminal for receiving a loop delay signal from the external.

The phase error correction loop 800 of the this embodiment further comprises a delay measurement unit 810 that receives the input signal of the phase error correction loop 800, i.e. the signal having the phase error, and the output signal of the error measurement module 210, i.e. the error signal. Referring back to FIG. 3, these signals are substantially the same but differ in that the error signal is delayed in time.

This delay is measured in the delay measurement unit 810, and the measured value which indicates the loop time delay of the phase error correction loop 800, is provided to an input terminal of the residual phase error compensator 820 so that the phase shift unit 500 may take the measured delay into account for compensating the residual phase error.

In any of the above embodiments, a smoothing mechanism may be implemented to further improve the reliability of the subsequent signal processing. For smoothing, either the slope value, or the product of the slope and the delay value, or the phase factor itself undergo a smoothing process before performing the actual residual phase error compensation. Additionally, the measured loop time delay may be smoothed.

Smoothing can be done either by averaging the respective values over a given period of time that may be predefined but that needs not necessarily to be constant, or by calculating a weighted sum of a previous value and a current value:

$$\hat{\psi}(t) = a \cdot \hat{\psi}(t-1) + b \cdot \psi(t)$$

where $\psi$ denotes the current value and $\hat{\psi}$ the smoothed value of the slope, the slope-delay product, or the phase factor. The smoothed value is then used for compensating the residual phase error by multiplying the output of the phase error correction loop 400, 700, 800 with the phase factor that has been smoothed, or that has been built using the smoothed value.

If smoothing is done on the slope values, this mechanism may be implemented in the slope measurement unit 710, or in an extra circuit. If smoothing is done on the slope-delay product or on the phase factor, this mechanism may be implemented in the phase factor building 520.

Figure 9:
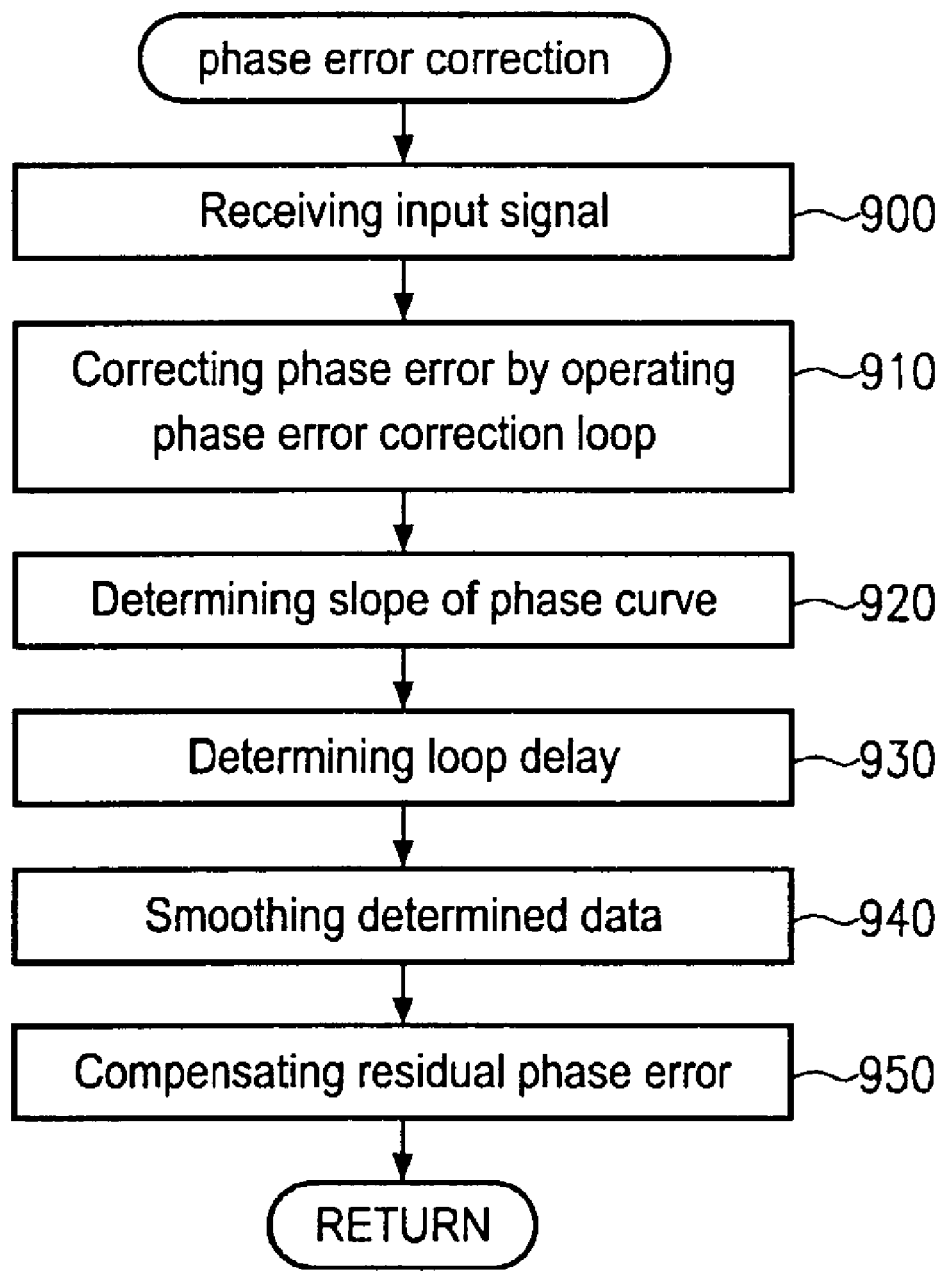
FIG. 9 is a flowchart illustrating the process of operating the phase error correction unit according to one of the embodiments.

Turning now to FIG. 9, a flowchart is shown illustrating the process of operating the phase error correction unit of the above embodiments. In step 900, a signal is received, e.g. from a frequency error correction unit 100. Then, the phase error correction loop 400, 700, 800 is operated to correct the phase error. The residual frequency error, i.e. the phase change rate or slope, is determined in step 920 as well as the loop time delay in step 930. As mentioned above, determining these values may be done either by retrieving pre-stored values, receiving respective values from external circuitry, or measuring the values. Then, there may be a smoothing process performed in step 940 on the determined data, on intermediate data used for building the phase factor, or on the phase factor itself, and finally, the residual phase error is compensated in step 950.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) receiver having a phase error correction unit comprising:
   a first subunit connected to receive an input signal having a phase error, said first subunit including a phase error correction mechanism to operate on said input signal and output a corrected signal, said corrected signal still having a residual phase error; and
   a second subunit connected to receive said corrected signal and adapted to compensate said residual phase error and output a compensated signal;
   wherein said phase error correction mechanism in said first subunit has a loop structure; and
   said second subunit is adapted to take into account a loop time delay of said loop structure when compensating said residual phase error.

2. The WLAN receiver of claim 1, wherein said phase error correction mechanism in said first subunit comprises:
   an error correction module connected to receive said input signal and adapted to output said corrected signal; and
   an error measurement module connected to receive said corrected signal and adapted to generate an error signal indicative of a phase error in said corrected signal;
   wherein said error correction module is further connected to receive said error signal and is adapted to generate said corrected signal dependent thereon.

3. The WLAN receiver of claim 2, wherein said error measurement module is connected to receive a despread or demodulated signal and is adapted to generate said error signal dependent thereon.

4. The WLAN receiver of claim 2, wherein said first subunit comprises:
   a delay measurement unit for measuring said loop time delay, said delay measurement unit being connected to receive said input signal and said error signal.

5. The WLAN receiver of claim 2, wherein:
   said error measurement module is adapted to estimate a rate at which the phase error of said input signal changes in time, and provide the determined rate to said second subunit; and
   said second subunit is adapted to further take into account said rate when compensating said residual phase error.

6. The WLAN receiver of claim 2, wherein:
   said first subunit comprises a slope measurement unit connected to receive said error signal, and adapted to estimate a rate at which the phase error of said input signal changes in time, said slope measurement unit being connected to said second subunit to provide the determined rate to said second subunit; and
   said second subunit is adapted to further take into account said rate when compensating said residual phase error.

7. The WLAN receiver of claim 1, wherein:
   said first subunit comprises a slope measurement unit connected to receive said input signal having the phase error, and adapted to determine a rate at which the phase error of said input signal changes in time, said slope measurement unit being connected to said second subunit to provide the determined rate to said second subunit; and
   said second subunit is adapted to further take into account said rate when compensating said residual phase error.

8. The WLAN receiver of claim 1, wherein said first subunit comprises:
   a delay measurement unit for measuring said loop time delay.

9. The WLAN receiver of claim 8, wherein said delay measurement unit is connected to said second subunit to provide the measured loop time delay to said second subunit.

10. The WLAN receiver of claim 1, wherein said second subunit is adapted to further take into account a rate at which the phase error of said input signal changes in time, when compensating said residual phase error.

11. The WLAN receiver of claim 10, wherein said second subunit comprises:
    a first multiplier connected to receive said loop time delay and said rate, and adapted to multiply said loop time delay with said rate.

12. The WLAN receiver of claim 11, wherein said second subunit further comprises:
    a phase factor builder connected to receive the product of said loop time delay and said rate from said first multiplier, and adapted to produce a phase factor based thereon; and
    a second multiplier connected to receive said corrected signal and said phase factor, and adapted to multiply said corrected signal with said phase factor.

13. The WLAN receiver of claim 10, wherein said second subunit comprises:
    an input terminal for receiving a signal indicating said rate.

14. The WLAN receiver of claim 10, wherein said second subunit is further adapted to smooth said rate and take into account the smoothed rate when compensating said residual phase error.

15. The WLAN receiver of claim 14, wherein said second subunit is adapted to average rate values over a given period of time, for smoothing said rate.

16. The WLAN receiver of claim 14, wherein said second subunit is adapted to generate a smoothed rate value by calculating a weighted sum of a previous smoothed rate value and the current rate.

17. The WLAN receiver of claim 1, wherein said second subunit comprises:
    a multiplier connected to receive said corrected signal and a phase factor, and adapted to multiply said corrected signal with said phase factor;
    wherein said phase factor depends on said loop time delay.

18. The WLAN receiver of claim 17, wherein said second subunit is further adapted to smooth said phase factor and multiply the smoothed phase factor with said corrected signal.

19. The WLAN receiver of claim 18, wherein said second subunit is adapted to average values of said phase factor over a given period of time, for smoothing said phase factor.

20. The WLAN receiver of claim 18, wherein said second subunit is adapted to smooth said phase factor by calculating a weighted sum of a previous value of said phase factor, and a current value of said phase factor.

21. The WLAN receiver of claim 1, wherein said second subunit comprises:
    a register storing data indicating said loop time delay of said loop structure.

22. The WLAN receiver of claim 1, wherein said second subunit comprises:
an input terminal for receiving a signal indicating said loop time delay of said loop structure.

23. The WLAN receiver of claim 1, further comprising:
a frequency error correction unit adapted to correct a frequency error in a received signal;
wherein said input signal having the phase error is a signal having a corrected frequency error.

24. The WLAN receiver of claim 1, being IEEE 802.11 b compliant.

25. A receiver in a data communications system, the receiver having a phase error correction unit comprising:
a first subunit connected to receive an input signal having a phase error, said first subunit including a phase error correction mechanism to operate on said input signal and output a corrected signal, said corrected signal still having a residual phase error; and
a second subunit connected to receive said corrected signal and adapted to compensate said residual phase error and output a compensated signal;
wherein said phase error correction mechanism in said first subunit has a loop structure; and
said second subunit is adapted to take into account a loop time delay of said loop structure when compensating said residual phase error.

26. An integrated circuit chip for perfoming a phase error correction in a data communications receiver, comprising:
first circuitry connected to receive an input signal having a phase error, said first circuitry including a phase error correction mechanism to operate on said input signal and output a corrected signal, said corrected signal still having a residual phase error; and
second circuitry connected to receive said corrected signal and adapted to compensate said residual phase error and output a compensated signal;
wherein said phase error correction mechanism in said first circuitry has a loop structure; and
said second circuitry is adapted to take into account a loop time delay of said loop structure when compensating said residual phase error.

27. A method of correcting a phase error in a WLAN (Wireless Local Area Network) receiver, the method comprising:
receiving an input signal having a phase error;
performing a phase error correction process to generate a corrected signal, said corrected signal still having a residual phase error; and
compensating said residual phase error;
wherein said phase error correction process has a loop structure; and
said compensation takes into account a loop time delay of said loop structure.

28. The method of claim 27, wherein said phase error correction process comprises:
receiving said corrected signal;
generating an error signal indicative of a phase error in said corrected signal;
wherein said corrected signal is generated dependent on said error signal.

29. The method of claim 28, wherein said error signal generation is performed dependent on a despread or demodulated signal.

30. The method of claim 28, further comprising:
measuring said loop time delay;
wherein measuring said loop time delay comprises:
receiving said input signal and said error signal.

31. The method of claim 27, further comprising:
determining a rate at which the phase error of said input signal changes in time.

32. The method of claim 31, wherein said compensation further takes into account said rate.

33. The method of claim 27, further comprising:
measuring said loop time delay.

34. The method of claim 27, wherein said compensation further takes into account a rate at which the phase error of said input signal changes in time.

35. The method of claim 34, further comprising:
receiving said loop time delay and said rate; and
multiplying said loop time delay with said rate.

36. The method of claim 35, further comprising:
producing a phase factor based on the product of said loop time delay and said rate; and
multiplying said corrected signal with said phase factor.

37. The method of claim 34, further comprising:
smoothing said rate;
wherein said compensation takes into account the smoothed rate.

38. The method of claim 37, wherein smoothing comprises:
averaging rate values over a given period of time.

39. The method of claim 37, wherein smoothing comprises:
generating a smoothed rate value by calculating a weighted sum of a previous smoothed rate value and the current rate.

40. The method of claim 27, further comprising:
multiplying said corrected signal with a phase factor;
wherein said phase factor depends on said loop time delay.

41. The method of claim 40, further comprising:
smoothing said phase factor;
wherein said multiplication is done using the smoothed phase factor.

42. The method of claim 41, wherein smoothing comprises:
averaging values of said phase factor over a given period of time.

43. The method of claim 41, wherein smoothing comprises:
calculating a weighted sum of a previous value of said phase factor, and a current value of said phase factor.

44. The method of claim 27, wherein said compensation comprises:
accessing a register storing data indicating said loop time delay of said loop structure.

45. The method of claim 27, further comprising:
correcting a frequency error in a received signal;
wherein said input signal having the phase error is a signal having a corrected frequency error.

46. The method of claim 27, for operating an IEEE 802.11 b compliant WLAN receiver.

47. A method of correcting a phase error in a data communications receiver, the method comprising:
receiving an input signal having a phase error;
performing a phase error correction process to generate a corrected signal, said corrected signal still having a residual phase error; and
compensating said residual phase error;
wherein said phase error correction process has a loop structure; and
said compensation takes into account a loop time delay of said loop structure.

* * * * *